March 25, 1952     T. E. RASMUSSEN     2,590,791
SPRING SUSPENSION MEANS FOR VEHICLES
Filed Nov. 27, 1950
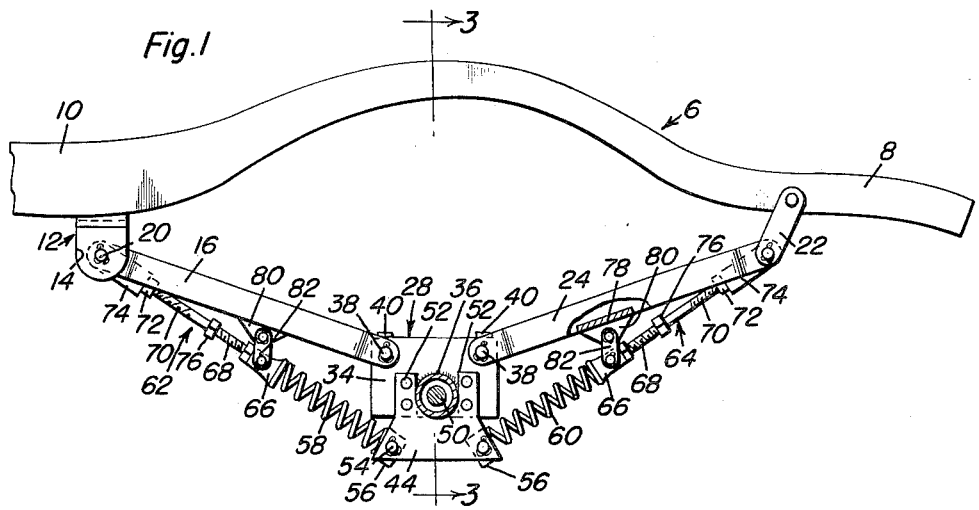
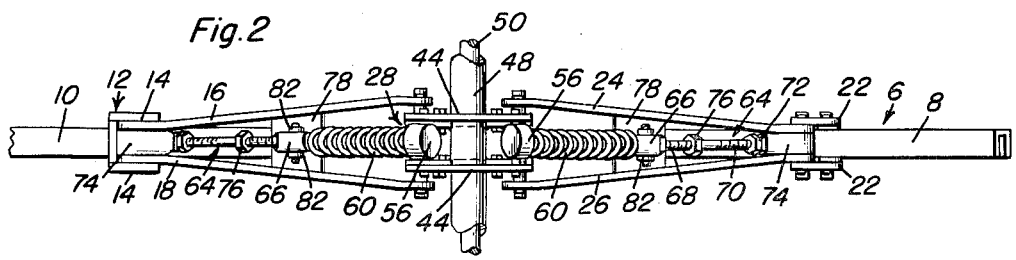
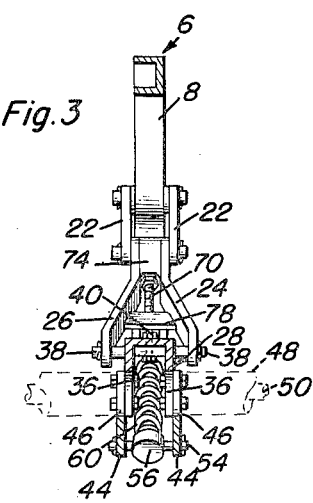
Theodore E. Rasmussen
INVENTOR.

Patented Mar. 25, 1952

2,590,791

UNITED STATES PATENT OFFICE 2,590,791

SPRING SUSPENSION MEANS FOR VEHICLES

Theodore E. Rasmussen, Scottsbluff, Nebr.

Application November 27, 1950, Serial No. 197,770

4 Claims. (Cl. 267—20)

The present invention relates to the broad class of spring devices and has relation, more in particular, to certain new and useful improvements in spring suspension means for a rear wheel axle construction in which, the springs proper, are coiled springs.

Briefly summarized, the preferred embodiment of the invention is characterized by a chassis frame member of any suitable type and an underlying wheel supported rear axle and housing, the latter at right angles to the chassis member. Levers, preferably in duplicated pairs, are interposed between the forward and rearward sides of the axle housing and are operatively connected at their respective outer ends to longitudinally spaced points on the chassis member. The respective inner ends of the pairs of levers are hingedly connected, through novel means, with the axle housing. Underlying the levers and also connected at their respective inner ends with the axle housing are the aforementioned coiled springs. These springs are connected at their respective outer ends with turnbuckles and the turnbuckles afford adjustable connections between the outer ends of the springs and the corresponding outer ends of the pairs of levers.

An object of the invention is to structurally, functionally and otherwise improve upon spring suspension assemblies in the category hereinunder advisement and, in so doing, to provide an assemblage which is unique in respect to the special adaptation and association of paired levers, coiled springs and chosen expedients which provide a well balanced over-all arrangement.

Another object of the invention is to provide vehicle axle spring suspension means in which manufacturers, dealers and users will find their essential requirements fully met and effectually contained.

Novelty is predicated on pairs of levers arranged as above stated wherein two simple coil springs underlie the respective inner end portions of the pairs of levers, the springs being hingedly connected by simple plates with the axle housing. Turnbuckles are joined to the outer respective ends of the springs and are adjustably connected with the corresponding outer ends of the pairs of levers in order to effectively tension the springs for controlling the sensitivity of actuation of the levers in conjunction with the axle means and chassis means.

Then, too, novelty has to do with the adapter means for effectively and mechanically joining the respective inner ends of the springs and levers with the axle housing, said means comprising a mount which is perched on and anchored to the axle housing in a manner to accommodate the hingedly connected inner ends of the pairs of levers and also in a manner to accommodate a pair of apron-like plates which are detachable and replaceable and which serve to accommodate cups in which the inner ends of the coiled springs are mounted.

Other objects and advantages will become readily apparent from the following description and the accompanying sheet of drawings.

In the accompanying sheet of drawings, wherein like numerals are employed to designate like parts throughout the views:

Figure 1 is a side elevation showing one of the spring suspension arrangements or assemblies as constructed in accordance with the principles of the present invention;

Figure 2 is a bottom plan view of the assemblage depicted in Figure 1;

Figure 3 is a central vertical section on the line 3—3 of Figure 1, looking in the direction of the arrows; and, Figure 4 is a fragmentary perspective view of the adapter means.

Referring now to the drawings by reference numerals and accompanying lead lines, the vehicle chassis frame is denoted by the numeral 6 and includes the usual chassis or frame member whose rearward end is denoted at 8 and whose forward end portion is broken off and denoted at 10. A U-shaped bracket 12 is welded or otherwise secured to and depends from 6 and has ears 14 and the ends of links 16 and 18 are hingedly mounted between the ears as at 20. A pair of shackle links are hingedly mounted on the rear end portion 8 of the chassis member and said links are denoted by the numerals 22. These serve to hingedly support the outer or rear end portions of the remaining pair of links or levers 24 and 26. Novel adapter means serves to operatively and hingedly join the respective inner ends of the pairs of links to the axle housing as is shown in Figure 4 and is denoted, as a unit by the numeral 28. Specifically, the means comprises a channel-shaped mount which is perched on and secured to an axle housing by welding or otherwise. The mount is channel-shaped and includes a flat web 30 and a pair of depending vertical spaced parallel walls 32 and 34. The lower central portions of the walls are notched as at 36 and the notches fit over the axle housing and are welded in place as shown in Figure 1. Supported in apertures provided therefor in the walls 32 and 33 are horizontal pintles 36 having projecting end portions which provide attaching journals 38—38 for the adjacent inner ends of the respective links 16, 18, 24 and 26. The links or levers are held in place by cotter keys or by any other convenient mode of attachment. It might be pointed out in connection with the showing in Figure 4 that the pintles are removably mounted in the mount and held by bolts 40—40 which extend through the web or top wall 30 and which pass through openings provided therefor in the pintles and are held in place by assembling and clamping nuts 42.

The side walls on the mount also serve as supports for the spaced parallel aprons or hanger plates 44—44. These are somewhat dovetail-shaped in general outline and have notched central portions 46 to accommodate the lower half portion of the axle housing 48, the axle being denoted at 50. Actually, these hanger plates are provided with upstanding extensions or arms 52—52 which are removably bolted to the stated walls 32 and 34.

Horizontal axles 54 are journaled in the bearing holes provided therefor in the hanger plates 44 and these axles are provided with rigidly mounted cups 56 which are located between the hanger plates. The cups serve to suitably saddle the coiled springs 58 and 60 in place. The coiled springs converge toward the axle means and underlie the adjacent pivoted inner end portions of the respective levers or links 16, 18, 24 and 26. The numerals 62 and 64 denote turnbuckles which provide mechanical connections between the respective outer ends of the springs 58 and 60 and the corresponding outer end portions of the levers. Each turnbuckle embodies a suitable fitting 66 which is rigidly connected to the adjacent end of the coacting spring and which is adjustably mounted on the screw threaded portion 68 of the turnbuckle bolt. The opposite screw threaded end of the latter, denoted at 70, is adjustably connected at 72 with a block 74 which is mounted between and hingedly connected with the corresponding end portions of the levers. The bolt is also provided with a tool nut 76 which is fixed in place and which facilitates the use of a wrench in adjusting the turnbuckle and consequently adjusting the tension of the spring with which it is associated.

In order to promote stability, to equalize stresses and strains and to contribute to the overall efficiency of the assemblage, it has been found desirable to connect the turnbuckle adjusted springs mechanically to the intermediate portions of the overlying pairs of links or levers. To this end, each pair of levers is provided with a web or plate 78 which is situated between the forward and rear end portions of the levers and is integrally joined with the levers. Each plate is provided with a central depending flange 80 which accommodates suspension links 82 which are hinged to the flange and which straddle and hinge on the coacting head or fitting 66 of the turnbuckle construction. Thus, one end of the turnbuckle is hinged and supported between the outer end portions of the hingedly suspended levers or links and the other end of the turnbuckle is hingedly suspended from the intermediate portions of the same pair of links. The spring is interposed between the pivotally mounted cup between the hanger plates and the coacting fittings of the turnbuckle.

Adjustable coiled springs and spring suspension devices in the category under advisement are of course old. It is old to utilize lever means similar to that herein depicted and to associate the coiled springs with the lever means by arranging the springs in somewhat underlying parallelism with the levers. The novelty in the instant matter is therefore in the improved structural details and their correspondingly improved coordination in the combination shown.

It is thought that persons skilled in the art to which the invention relates will be able to obtain a clear understanding of the invention after considering the description in connection with the drawings. Therefore, a more lengthy description is regarded as unnecessary.

Minor changes in shape, size and arrangement of details coming within the field of invention claimed may be resorted to in actual practice, if desired.

Having described the invention, what is claimed as new is:

1. In combination, a relatively stationary chassis member, a wheel supporting axle means beneath and at right angles to said member, a mount perched on and rigidly secured to said axle means, a fixed bracket secured to said chassis member, shackle links hingedly attached to and depending from said chassis member at a point spaced from said bracket, a forward pair of levers having their forward ends hingedly connected to said bracket, a rearward pair of substantially duplicate levers having their rearward ends hingedly connected with said shackle links, means separably and hingedly joining respective inner ends of the respective levers with said mount, turnbuckles hingedly mounted at their respective outer ends on the corresponding respective end portions of the forward and rearward pairs of levers, coiled springs connected to the respective inner ends of said turnbuckles, and means hingedly connecting the respective inner ends of said coiled springs with said mount, said means comprising a pair of hanger plates detachably bolted on said mount, and cups hingedly mounted between said hanger plates, the adjacent ends of said springs being fitted and anchored in said cups.

2. The structure as specified in claim 1 together with links hingedly attached to and depending from the intermediate portions of said levers, said links being hingedly joined with the adjacent inner end portions of the respective turnbuckles, whereby the turnbuckles are wholly supported from their respective complemental levers.

3. Adapter means for use in a spring suspension assemblage of the class described comprising an inverted U-shaped mount adapted to be perched and rigidly anchored on an axle housing, and a pair of insertable and removable pintles detachably supported on said mount and having end portions projecting beyond the side walls of the mount to facilitate hinged connection of levers to said mount, a pair of hanger plates detachably bolted on and depending from the walls of said mount, and cup means removably mounted on and between said plates to accommodate coiled springs.

4. In combination, a chassis member, wheel supporting axle means beneath and at right angles to said member, levers pivotally joined at their respective outer ends to said member, adapter means pivotally joining the inner ends of said levers to said axle means, a pair of complemental coiled springs, the latter underlying said levers and having their adjacent inner ends hingedly attached to said adapter means, turnbuckles connected at their inner ends to the respective outer ends of coiled springs, means pivotally joining the respective outer ends of the turnbuckles with coacting portions of said chassis member, and linkage means mechanically joining the inner ends of said turnbuckles to intermediate portions of said levers.

THEODORE E. RASMUSSEN.

REFERENCES CITED

The following references are of record in the file of this patent:

UNITED STATES PATENTS

| Number | Name | Date |
|---|---|---|
| 1,439,614 | Borggrave | Dec. 19, 1922 |
| 1,439,626 | Hotto | Dec. 19, 1922 |
| 1,678,662 | Wilson et al. | July 31, 1928 |
| 1,763,192 | Shears | June 10, 1930 |

FOREIGN PATENTS

| Number | Country | Date |
|---|---|---|
| 77,422 | Austria | July 25, 1919 |